(12) United States Patent
Wu et al.

(10) Patent No.: US 9,390,075 B2
(45) Date of Patent: Jul. 12, 2016

(54) METHOD AND APPARATUS FOR ACQUIRING CONTENT INFORMATION OF A WEB PAGE

(71) Applicants: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

(72) Inventors: Xinli Wu, Beijing (CN); Jianwu Yang, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 337 days.

(21) Appl. No.: 13/964,397

(22) Filed: Aug. 12, 2013

(65) Prior Publication Data

US 2014/0047311 A1 Feb. 13, 2014

(30) Foreign Application Priority Data

Aug. 13, 2012 (CN) .......................... 2012 1 0287661

(51) Int. Cl.
*G06F 17/22* (2006.01)
*G06F 17/30* (2006.01)

(52) U.S. Cl.
CPC ........ *G06F 17/2235* (2013.01); *G06F 17/3089* (2013.01); *G06F 17/30867* (2013.01)

(58) Field of Classification Search
CPC .......... G06F 17/2235; G06F 17/30876; G06F 17/30867; G06F 17/3089; G06F 17/30887
See application file for complete search history.

(56) References Cited

U.S. PATENT DOCUMENTS

| 6,533,822 | B2 * | 3/2003 | Kupiec | G06F 17/30719 707/E17.094 |
| 6,707,470 | B1 * | 3/2004 | Sashihara | G06F 17/30876 707/E17.112 |
| 7,293,007 | B2 * | 11/2007 | Ma | G06F 17/30864 |
| 7,853,592 | B2 * | 12/2010 | Kwak | G06F 17/30867 707/736 |
| 8,266,242 | B2 * | 9/2012 | Foulger | G06F 17/30873 709/217 |
| 8,620,849 | B2 * | 12/2013 | Moitra | G06F 17/30864 706/50 |
| 2002/0010719 | A1 * | 1/2002 | Kupiec | G06F 17/30719 715/253 |
| 2007/0204219 | A1 * | 8/2007 | Foulger | G06F 17/30873 715/234 |
| 2011/0225115 | A1 * | 9/2011 | Moitra | G06F 17/30864 706/50 |

\* cited by examiner

*Primary Examiner* — Maikhanh Nguyen
(74) *Attorney, Agent, or Firm* — Finnegan, Henderson, Farabow, Garrett & Dunner, LLP

(57) ABSTRACT

The present disclosure provides a method and apparatus for acquiring a content information of a page, by acquiring an access link primary address and an access link secondary address of a website, and then determining a layout page corresponding to the website through the access link primary address and the access link secondary address, and extracting summary information of each post included in the layout page from a source code file of the layout page; and acquiring a link address of each post from the summary information, determining a post page of each post according to the link address, and extracting content information of each post from a source code file of the post page, the method disclosed in the present disclosure could acquire latest initiating post and replying post information published on the bulletin board system website can in real time, and acquire replying posts incrementally.

7 Claims, 3 Drawing Sheets

METHOD AND APPARATUS FOR ACQUIRING CONTENT INFORMATION OF A WEB PAGE

CROSS-REFERENCE TO RELATED APPLICATION

This application claims benefit of priority from Chinese Patent Application No. 201210287661.8, filed Aug. 13, 2012, the entire content of which is incorporated herein by reference.

FIELD OF THE INVENTION

The present invention relates to the field of electronic information technologies and particularly to a method and apparatus for acquiring information.

BACKGROUND OF THE INVENTION

At present, people pay increasing attention to the important value of information over the Internet. For example, people may use the information on the Internet to evaluate the image of an organization or enterprise, to evaluate the influence of a person, to monitor the public praise of a product brand. A government, police, publishing company or other departments of organizations may use the Internet to manage operating routines and the like. The more comprehensive the acquired information is, the higher the practical values of these various applications will be, and the more accurate various evaluation indexes thereof will be.

As stated in the "28$^{th}$ Statistical Report on Development of Internet Networks in China" recently published by the CNNIC, there are 485 millions Internet users in China at the end of June, 2011, including over 140 millions forum/BBS users occupying approximately 29.7% of Internet applications. Information on forum/BBS (Bulletin Board System) websites is an important constituent part of information resources throughout the Internet. The BBS is a service system of electronic information over the Internet. Its interface typically includes texts primarily for the purpose of offering a space in which numerous Internet users communicate with each other. It offers a public electronic white board on which each user can publish information or make a comment (such published information is also referred to as a post or a post text), and initially published information is referred to as initiating post information. If a user viewing published initiating post information makes a corresponding comment on relevant contents of any published initiating post, such comment information can be refereed to as replying post information. Some forum/BBS websites can be logged in and accessed through telnet, and a list of posts can be presented in various modes, where in a first display mode, all of initiating post information is displayed in a descending order in time, and in a second display mode, initiating and replying post information is mixed together for display. In the second mode, the initiating post information can not be retrieved from the websites through existing search engines, and only part of such information can be acquired even if a general information acquiring system is used, so that the information acquiring system can not determine accurately the initiating and replying post information on the websites, thus degrading the accuracy of various evaluation indexes.

SUMMARY OF THE INVENTION

The invention provides a method and apparatus for acquiring information to address the problem in the prior art of inconvenient information acquisition arising from the mixing of original information and supplementary information in a specific mode on some website pages.

The invention provides a method for acquiring information including:

determining address information of a bulletin board system website to be acquired and an information acquisition rule;

when receiving an information acquisition request to acquire contents of any website, acquiring an access link primary address and an access link secondary address of the website;

determining a layout page corresponding to the website through the access link primary address and the access link secondary address, and extracting summary information of each post included in the layout page from a source code file of the layout page; and acquiring a link address of each post from the summary information, determining a post page of each post according to the link address, and extracting content information of each post from a source code file of the post page.

A layout page corresponding to the access link primary address comprises summary information of initiating posts, and a layout page corresponding to the access link secondary address comprises summary information of the initiating posts and replying posts.

In an optimized implementation method, the information acquisition rule includes that:

information items of the summary information extracted from the layout page comprise a post title, a post link address, an author initiating a post, initiating time of a post, the number of clicks and the number of replies; and information items extracted from the post page comprise a post title, a post text and a same-subject link address.

The summary information further comprises an attribute identifier of each post used to indicate whether the post is an initiating post.

The attribute identifier is determined as follows:

when determining that a link address corresponding to the layout page is the primary address, determining that the post is an initiating post and thus corresponds to a first attribute identifier; and when determining that an access link address corresponding to the layout page is the secondary address, determining the attribute identifier of the post according to feature information of a title of the post.

Determining the attribute identifier of the post according to feature information of the title of the post comprises:

detecting whether the beginning of the title of the post includes first feature information, if so, then determining that the post is a replying post and thus corresponds to a second attribute identifier; and if the beginning of the title of the post does not include the first feature information, then setting a third attribute identifier correspondingly to indicate attribute of the post as an unknown format.

Extracting content information of each post from the source code file of the post page includes:

when the attribute identifier is the first attribute identifier, extracting and outputting the title of the post and text information of the post; and when the attribute identifier is the second attribute identifier, extracting a same-subject link address of the current post from source codes corresponding to the post page, determining same initiating post link address information as the same-subject link address among link address information to be acquired and already acquired, and updating the number of replies to an initiating post corresponding to the initiating post link address information.

When the attribute identifier of the post is the third attribute identifier, extracting content information of each post from the source code file of the post page includes:

extracting a same-subject link address of the current post from source codes corresponding to the post page; and firstly comparing the extracted same-subject link address with a link address corresponding to the current post page, and if they are the same, then determining that the post is an initiating post, and outputting the extracted post title and post text information; and if they are different, then determining that the post is a replying post, determining same initiating post link address information as the same-subject link address among link address information to be acquired and already acquired, and updating the number of replies to an initiating post corresponding to the initiating post link address information.

According to the foregoing method, the invention further provides an apparatus for acquiring information, which includes:

a configuring module configured to determine address information of a bulletin board board system website to be acquired and an information acquisition rule;

an access link address determining module configured, when receiving an information acquisition request to acquire contents of any website, to acquire an access link primary address and an access link secondary address of the website;

a post summary information acquiring module configured to determine a layout page corresponding to the website through the access link primary address and the access link secondary address, and to extract summary information of each post included in the layout page from a source code file of the layout page; and a post content information acquiring module configured to acquire a link address of each post from the summary information, to determine a post page of each post according to the link address, and to extract content information of each post from a source code file of the post page.

The summary information further comprises an attribute identifier of each post used to indicate whether the post is an initiating post, and the post summary information acquiring module is further configured to determine the attribute identifier as follows:

when determining that a link address corresponding to the layout page is the primary address, determining that the post is an initiating post and thus corresponds to a first attribute identifier; and when determining that an access link address corresponding to the layout page is the secondary address, determining the attribute identifier of the post according to feature information of a title of the post.

The invention discloses a method and apparatus for acquiring information, and the method includes: determining address information of a bulletin board system website to be acquired and an information acquisition rule; when receiving an information acquisition request to acquire contents of any website, acquiring an access link primary address and an access link secondary address of the website; determining a layout page corresponding to the website through the access link primary address and the access link secondary address, and extracting summary information of each post included in the layout page from a source code file of the layout page; and acquiring a link address of each post from the summary information, determining a post page of each post according to the link address, and extracting content information of each post from a source code file of the post page. Through this method, latest initiating post and replying post information published on the bulletin board system website can be acquired in real time, and replying posts can be acquired incrementally.

DETAILED DESCRIPTION OF THE EMBODIMENTS

An embodiment of the invention provides a method for acquiring information, which includes: determining address information of a bulletin board system website to be acquired and an information acquisition rule; when receiving an information acquisition request to acquire contents of any website, acquiring an access link primary address and an access link secondary address of the website; determining a layout page corresponding to the website through the access link primary address and the access link secondary address, and extracting summary information of each post included in the layout page from a source code file of the layout page; and acquiring a link address of each post from the summary information, determining a post page of each post according to the link address, and extracting content information of each post from a source code file of the post page.

Figure 1:
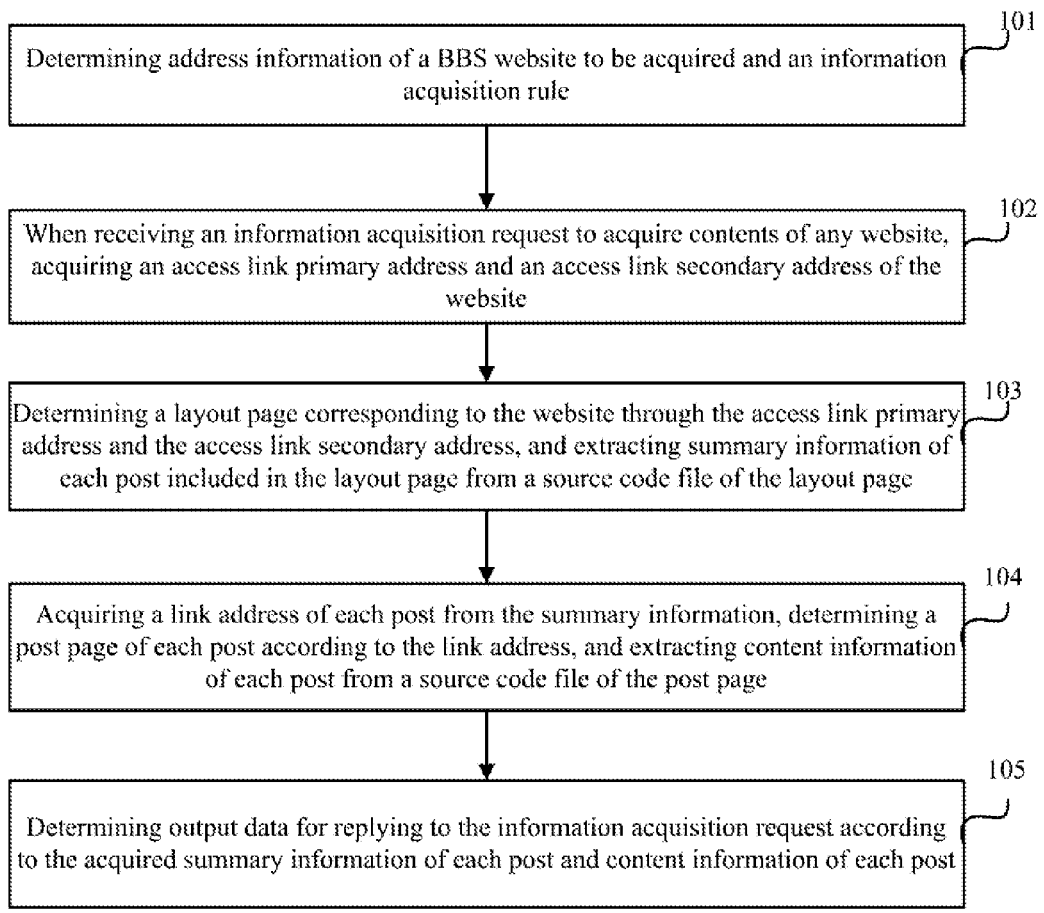
FIG. 1 is a flow chart of a method for acquiring information according to an embodiment of the invention.

As shown in FIG. 1, the invention will be detailed below in connection with a specific embodiment by taking a bulletin board system website as an example:

Step 101, determining address information of a BBS website to be acquired and an information acquisition rule.

Relevant information of the BBS website includes an access link primary address and an access link secondary address. A layout page corresponding to the access link primary address includes summary information of initiating posts, and a layout corresponding to the access link secondary address includes summary information of the initiating posts and replying posts, that is, a list of posts in a layout corresponding to the access link primary address including information of all the initiating posts, and a list of posts in the layout corresponding to the access link secondary address including information of the initiating posts and the replying posts.

The relevant information of the BBS website further includes a rule to extract information items from a layout page (in which summary information of each post text is displayed) and a post page (in which specific content information under a post title, e.g., specific content information of an initiating post and replying information to the initiating post, is displayed). The information items extracted from the layout page include a post title, a post link address, an author initiating a post, initiating time of a post, the number of clicks and the number of replies, etc., and the information items extracted from the post page include a post title, a post text, a link address of "reading under the same subject" (through which all the information of initiating posts and replying posts under the same subject can be acquired) and the like.

Since published contents of the website may be updated at any time, data on the website can be acquired at a certain time interval in an embodiment of the invention in order to acquire, in real time, the updated published information, where the acquisition interval can be set for updating at a fixed time interval or adaptive updating, and the length of the time interval at which the data is acquired can be determined according to a frequency at which the published information of the website is updated in a mode of updating at a fixed time interval.

Step 102, when receiving an information acquisition request to acquire contents of any website, acquiring an access link primary address and an access link secondary address of the website.

In order to manage more effectively the address information of the website to be acquired, the primary link addresses and secondary link addresses corresponding to acquisition tasks can be added to a URL queue in an embodiment of the invention. When the system initially starts to operate, the primary link addresses and the secondary link addresses of all the acquisition tasks are added to the URL queue at a time; and during operation of the system, acquisition time intervals of respective acquisition tasks (each acquisition task corresponds to an access link primary address and an access link secondary address of the website) are monitored in real time, and only a link addresses of an acquisition task, which it is time to update, are added to the URL queue every time.

Furthermore, if there are a large number of acquisition tasks loaded by the system, the acquisition tasks are added dispersedly to the URL queue and randomly in batches in a certain time period when initially operating, thereby to alleviate the problems of resource contention and queuing arising from concurrent running of a large number of acquisition tasks.

Step 103, determining a layout page corresponding to the website through the access link primary address and the access link secondary address (or the access link primary address and secondary address), and extracting summary information of each post included in the layout page from a source code file of the layout page.

The summary information of the post includes a post title, a post link address, an author initiating the post, initiating time of the post, the number of clicks, the number of replies and the like.

The summary information further includes an attribute identifier of each post:

When it is determined that a link address corresponding to the layout page is the primary address, it is determined that the post is an initiating post and thus corresponds to a first attribute identifier (which can be set to 1); and When it is determined that an access link address corresponding to the layout page is the secondary address, the attribute identifier of the post is determined according to feature information of the post title. A particular implementation according to one embodiment is as follows:

(1) Detecting whether the beginning of the title of the post includes first feature information, and if so, determining that the post is a replying post and thus corresponds to a second attribute identifier (which can be set to 0).

Particularly, the first feature information can be a feature word, e.g., "Re" or "Reply", at the beginning of the title of the post to indicate replying post information to an initiating post.

(2) If the beginning of the title of the post does not include the first feature information, it cannot be determined whether the post is an initiating post or a replying post, and thus a third attribute identifier (which can be set to be −1) can be set correspondingly to indicate the attribute of the post as an unknown format. The absence of the first feature information means that the post title does not start with "Re:" or "Reply:".

Step 104, acquiring a link address of each post from the summary information, determining a post page of each post according to the link address, and extracting content information of each post from a source code file of the post page.

The content information includes a title and post text information of each post.

In one embodiment of the invention, according to different natures of links, link addresses to be acquired can be divided into three categories respectively corresponding to three URL queues. The URL queues particularly include a Qmainurl queue, a Qsecurl queue and a Qconturl queue, each of which is defined as follows:

The Qmainurl queue maintains primary addresses of all the task links to be acquired;

The Qsecurl queue maintains secondary addresses of all the task links to be acquired; and The Qconturl queue maintains link addresses of all the initiating post or replying post pages to be acquired.

In this example, if it is determined that it is time to update a website aaa, then an access link primary address of the website aaa, for example, http://bbs.nju.edu.cn/bbstdoc?board=Forum, is added to the Qmainurl queue; and An access link secondary address, http://bbs.nju.edu.cn/bbsdoc?board=Forum&type=tdoc, is added to the Qsecurl queue.

Step 105, determining output data for replying to the information acquisition request according to the acquired summary information of each post and content information of each post.

The data output includes two types of information:

One type is information of an initiating or replying post, where either an initiating post or a replying post is a record including a website name, a layout name, a post title, a post link address, an author initiating a post, initiating time of a post, the number of clicks, the number of replies, a post text and an indicator of whether a post is an initiating post; and The other type of information is information specific to update the number of replies to an initiating post, and the system will output in real time incremental changes in the number of replies to all the initiating posts maintained by the system, where information items include post link addresses, the last number of replies and the current number of replies.

Figure 2:
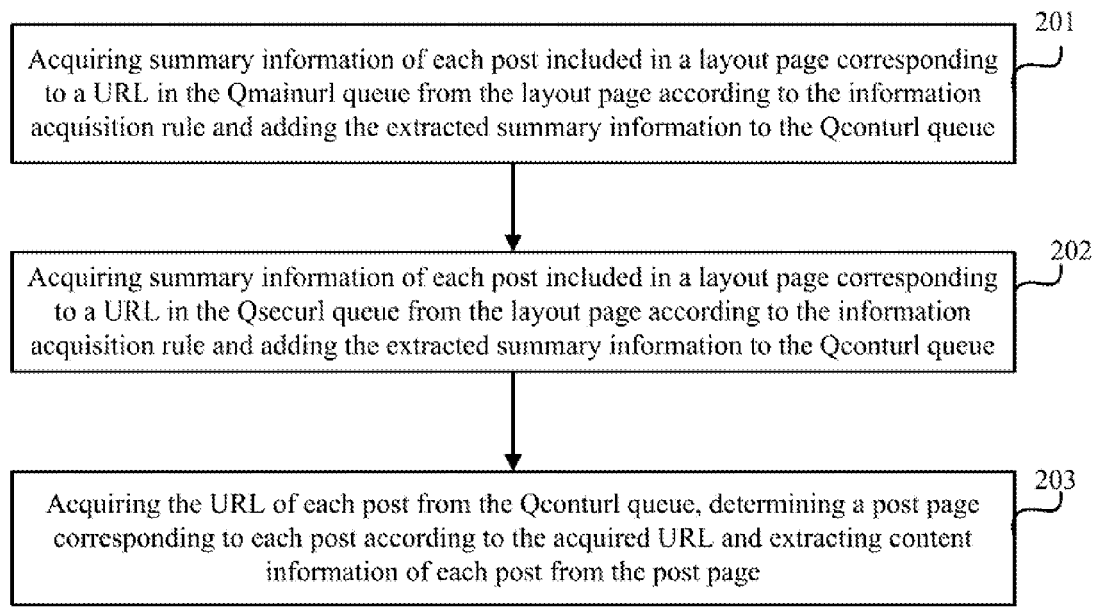
FIG. 2 is a flow chart of an implementation method for acquiring relevant information in a layout page and a post page according to an embodiment of the invention.

As shown in FIG. 2, a specific implementation of obtaining the relevant information in the layout page and the post page in the step 103 and the step 104 in an embodiment of the invention can be as follows:

Step 201, acquiring summary information of each post included in a layout page corresponding to a URL in the Qmainurl queue from the layout page according to the information acquisition rule and adding the extracted summary information to the Qconturl queue.

A URL to be acquired is acquired from the Qmainurl queue according to a URL acquisition strategy of the system, and webpage source codes are acquired through an Http request.

In one embodiment of the invention, the URL acquisition strategy need take into account a variety of factors, e.g., the current number of idle threads, queuing conditions of the three URL queues, a courtesy issue of an access to the website and the like.

Summary information of each post is extracted from the acquired source code file of the layout page, where the summary information includes a post title, a post link address, an author initiating a post, initiating time of a post, the number of clicks, the number of replies and the like. In the embodiment of the invention, in order to facilitate determining the acquired data information, a data structure, URL_INFO, can be created per post so that each entry of the data structure corresponds to relevant contents of a post.

The data structure includes an attribute identifier used to indicate whether the acquired post is an initiating post in addition to the above-mentioned extracted information, where specific instances of the attribute identifier can include 1 indicating an initiating post, 0 indicating a replying post and −1 indicating an unknown post.

Here the identifier is set to 1, and then the post link address is added to the Qconturl queue. When it is added to the Qconturl queue, it shall be determined whether there has been a same post link address in the Qconturl queue, and if so, it will not be added any more.

Step 202, acquiring summary information of each post included in a layout page corresponding to a URL in the Qsecurl queue from the layout page according to the information acquisition rule and adding the extracted summary information to the Qconturl queue.

A webpage capturing module acquires a URL to be acquired from the Qsecurl queue according to the URL acquisition strategy of the system and acquires webpage source codes through an Http request; and Information is extracted from the acquired page source code file, where the extracted information includes a post title, a link address of each post, an author initiating a post, initiating time of a post.

For the extracted information, a data structure and URL_INFO can be created for each post so that each object in the data structure corresponds to the extracted information of each post (including initiating posts and replying posts), and the attribute identifier of each post is determined.

The attribute identifier of each post is determined in a particular implementation method as follows:

(1) Detecting whether the beginning of the title of the post includes first feature information, and if so, the attribute identifier of the post is set to 0, where the first feature information can be a feature word, e.g., "Re:" or "Reply:", at the beginning of the title of the post to indicate replying post information to an initiating post; and (2) If the beginning of the title of the post does not include the first feature information, the identifier of the initiating or replying post is set to −1 indicating the attribute of the post as an unknown format. The absence of the first feature information means that the post title does not start with "Re:" or "Reply:".

The extracted URL link of each post is added to the Qconturl queue, and before it is added to the Qconturl queue, it is determined whether there has been a same post link address in the Qconturl queue, and if so, it will not be added any more.

Step 203, acquiring the URL of each post from the Qconturl queue, determining a post page corresponding to each post according to the acquired URL and extracting content information of each post from the post page. A particular implementation can be as follows:

A URL to be acquired (the URL is specific to each post, and a webpage corresponding to the URL displays content information of each post) is acquired from the Qsecurl queue according to the URL acquisition strategy of the system, and webpage source codes are acquired through an Http request; and The title and text information of the post are extracted from the webpage source code file. Corresponding information is output for a different attribute identifier corresponding to the post.

When the attribute identifier is 1, the extracted title and text information of the post are output directly.

When the attribute identifier is 0, which indicates that contents of a post displayed in the post page are replying posts to an initiating post, a corresponding message is output as follows:

A same-subject link address of the current post is extracted from source codes corresponding to the post page; and The same initiating post link address information as the same-subject link address is determined among URL information to be acquired and already acquired in the Qconturl queue, and the number of replies to an initiating post corresponding to the initiating post link address information is updated.

When the attribute identifier is −1, it can not be determined whether the current post is an initiating post or a replying post, and a corresponding message is output as follows:

A same-subject link address of the current post is extracted from source codes corresponding to the post page; and Firstly the extracted same-subject link address is compared with the URL link corresponding to the current post page, and if they are the same, it is determined that the post is an initiating post, and the extracted title and text information of the post are output; and If they are different, it is determined that the post is a replying post, the same initiating post link address information as the same-subject link address is determined among URL information to be acquired and already acquired in the Qconturl queue, and the number of replies to an initiating post corresponding to the initiating post link address information is updated.

Figure 3:
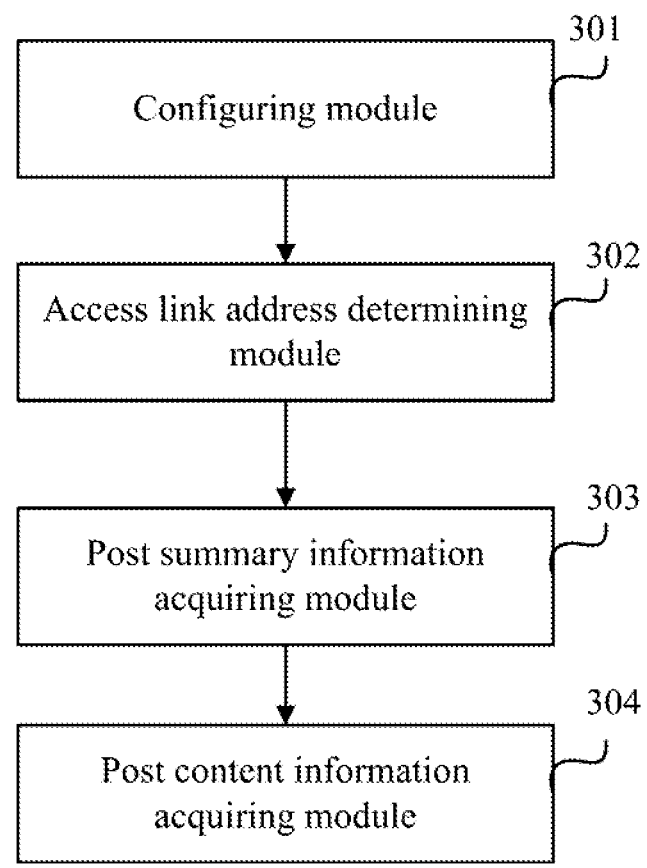
FIG. 3 is a structural diagram of an apparatus for acquiring information according to an embodiment of the invention.

As illustrated in FIG. 3, according to the method provided in the foregoing embodiment, the invention further provides an apparatus for acquiring information, which includes a configuring module 301, an access link address determining module 302, a post summary information acquiring module 303, and a post content information acquiring module 304.

The configuring module 301 is configured to determine address information of a bulletin board system website to be acquired and an information acquisition rule.

The configuring module 301 can reside alone as a separate operating program or run as a module in a system together with subsequent modules. When it resides as a separate module, the configured information can be transmitted to a task managing module in a standard format xml or stored as an entity acquisition task file, and an access link address determining module 302 and a post summary information acquiring module 303 can load and parse the file for use.

The access link address determining module 302 is configured, when receiving an information acquisition request to acquire contents of any website, to acquire an access link primary address and an access link secondary address of the website.

The post summary information acquiring module 303 is configured to determine a layout page corresponding to the website through the access link primary address and the access link secondary address, and to extract summary information of each post included in the layout page from a source code file of the layout page.

The summary information further includes an attribute identifier of each post used to indicate whether the post is an initiating post, and the post summary information acquiring module 303 is further configured to determine the attribute identifier as follows:

When determining that a link address corresponding to the layout page is the primary address, determining that the post is an initiating post and thus corresponds to a first attribute identifier; and When determining that an access link address corresponding to the layout page is the secondary address, determining the attribute identifier of the post according to feature information of a title of the post.

The post content information acquiring module 304 is configured to acquire a link address of each post from the summary information, to determine a post page of each post according to the link address, and to extract content information of each post from a source code file of the post page.

The invention provides a method and apparatus for acquiring information. According to some embodiments, the method includes: determining address information of a bulletin board system website to be acquired and an information acquisition rule; when receiving an information acquisition request to acquire contents of any website, acquiring an access link primary address and an access link secondary address of the website; determining a layout page corresponding to the website through the access link primary address and the access link secondary address, and extracting summary information of each post included in the layout page from a source code file of the layout page; and acquiring a link address of each post from the summary information, determining a post page of each post according to the link address, and extracting content information of each post from a source code file of the post page. Through this method, latest initiating post and replying post information published on the bulletin board system website can be acquired in real time, replying posts can be acquired incrementally, and essential data for an initiating post-based analysis can be provided for various other applications in need of such information and can include a title, initiating post contents, an author, replying post contents, a replying post author, the number of replies and the like. Information is acquired from layout pages corresponding to an access link primary address and secondary address to make the acquired information more comprehensive, and initiating posts are distinguished from replying posts so that a relevant application can perform various statistical analysis and semantic analysis processes based upon collected data.

Evidently those skilled in the art can make various modifications and variations to the invention without departing from the spirit and scope of the invention. Thus, the invention is also intended to encompass these modifications and variations to the invention so long as these modifications and variations come into the scope of the claims appended to the invention and their equivalents.

The invention claimed is:

1. A method for acquiring information, comprising:
   acquiring, by a mobile equipment, an access link primary address and an access link secondary address of a website;
   determining, by the mobile equipment, a layout page corresponding to the website through the access link primary address and the access link secondary address;
   extracting, by the mobile equipment, summary information of each post included in the layout page from a source code file of the layout page, the summary information comprising a post title, a post link address, an author initiating a post, initiating time of a post, a number of clicks and a number of replies defined in an information acquisition rule, and an attribute identifier of a post for indicating whether the post is an initiating post;
   acquiring, by the mobile equipment, a link address of each post from the summary information;
   determining a post page of each post according to the link address; and
   extracting information items from a source code file of the post page, the information items comprising a post title, a post text, and a same-subject link address defined in the information acquisition rule;
   wherein a layout page corresponding to the access link primary address comprises summary information of an initiating post, and a layout page corresponding to the access link secondary address comprises summary information of the initiating post and one or more replying posts.

2. The method according to claim 1, wherein the attribute identifier is determined as follows:
   when determining that a link address corresponding to the layout page is the primary address, determining that the post is an initiating post, and the attribute identifier is determined to be a first attribute identifier indicative of the post being an initiating post; and
   when determining that an access link address corresponding to the layout page is the secondary address, the attribute identifier is determined according to feature information of a title of the post.

3. The method according to claim 2, wherein determining the attribute identifier of the post according to feature information of the title of the post comprises:
   detecting whether the beginning of the title of the post includes first feature information, and if so, determining that the post is a replying post, and the attribute identifier is determined as a second attribute identifier indicative of the post being a replying post; and
   if the beginning of the title of the post does not include the first feature information, the attribute identifier is determined as a third attribute identifier, the value of the third attribute identifier being set to indicate attribute of the post as an unknown format.

4. The method according to claim 3, wherein extracting content information of each post from the source code file of the post page comprises:
   when the attribute identifier is the first attribute identifier, extracting and outputting the title of the post and text information of the post; and
   when the attribute identifier is the second attribute identifier, extracting a same-subject link address of the current post from source codes corresponding to the post page, determining same initiating post link address information as the same-subject link address among link address information to be acquired and already acquired, and updating the number of replies to an initiating post corresponding to the initiating post link address information.

5. The method according to claim 4, wherein when the attribute identifier of the post is the third attribute identifier, extracting content information of each post from the source code file of the post page comprises:
   extracting a same-subject link address of the current post from source codes corresponding to the post page; and
   firstly comparing the extracted same-subject link address with a link address corresponding to the current post page, and if they are the same, determining that the post is an initiating post, and outputting the extracted post title and post text information; and
   if they are different, determining that the post is a replying post, determining same initiating post link address information as the same-subject link address among link address information to be acquired and already acquired, and updating the number of replies to an initiating post corresponding to the initiating post link address information.

6. The method according to claim 1, wherein the summary information further comprises an attribute identifier of each post, wherein the attribute identifier is generated based on a link address corresponding to the layout page.

7. An apparatus for acquiring information, comprising:
  a memory that stores a set of instructions; and
  one or more processors configured to execute the set of instructions to:
    acquire an access link primary address and an access link secondary address of a website;
    determine a layout page corresponding to the website through the access link primary address and the access link secondary address;
    determining an attribute identifier of each post included in the layout page for indicating whether the post is an initiating post, wherein the determination of the attribute identifier comprises the one or more processors being configured to execute the setoff instructions to:
      if an access link address corresponding to the layout page is the access link primary address, determine the attribute identifier to be a first attribute identifier indicative of the post being an initiating post, and
      if an access link address corresponding to the layout page is the access link secondary address, determine the attribute identifier according to feature information of a title of the post;
  extract summary information of each post included in the layout page from a source code file of the layout page, the summary information comprising the determined attribute identifier;
  acquire a link address of each post from the summary information, to determine a post page of each post according to the link address;
  extract content information of each post from a source code file of the post page;
  wherein a layout page corresponding to the access link primary address comprises summary information of an initiating post, and a layout page corresponding to the access link secondary address comprises summary information of the initiating post and one or more replying posts.

* * * * *